3,426,246
FLASHING DEVICE FOR SELF-PROPELLED
VEHICLES IN PARTICULAR
Jacques Alphen, La Celle-St.-Cloud, France, assignor to
Societe dite: Projecteurs Cibie, Bobigny Seine-Saint-
Denis, France, a company of France
Filed Dec. 12, 1966, Ser. No. 600,824
Claims priority, application France, Dec. 13, 1965,
42,074
U.S. Cl. 315—83     6 Claims
Int. Cl. B60q 1/02

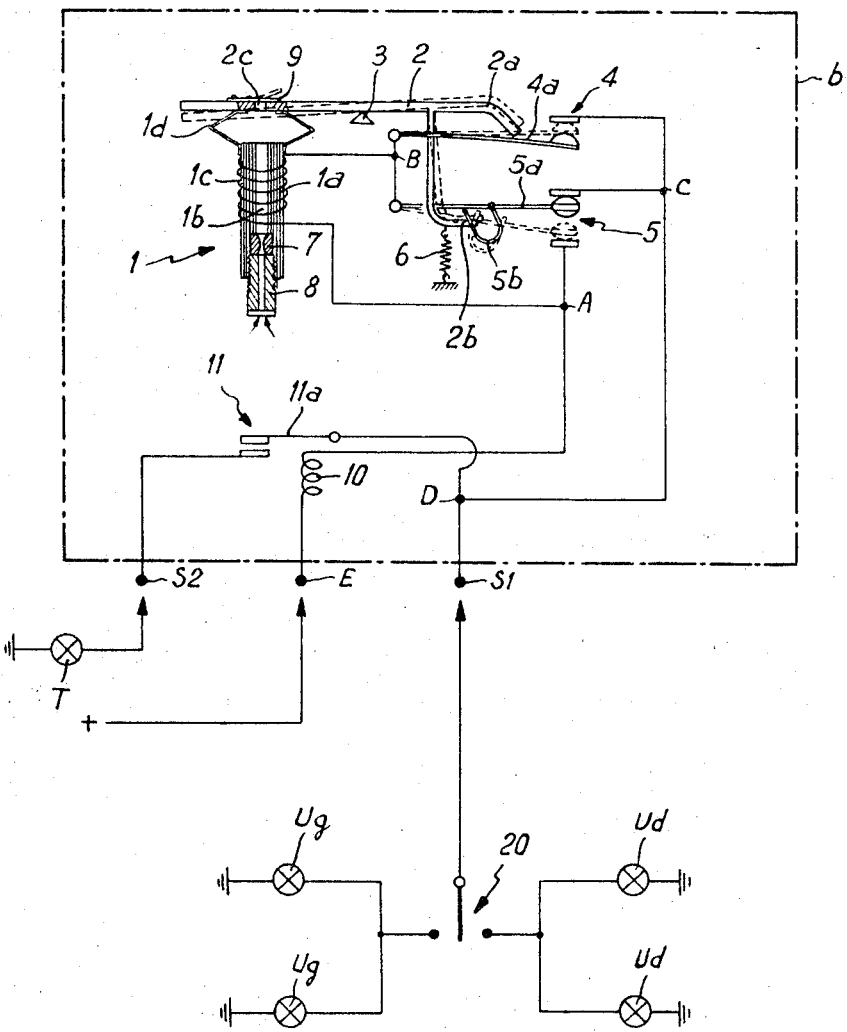

The present invention has as its object a flashing device for periodical supply to electrical circuits. It is known that devices of this nature are employed in particular for supplying the incandescent bulbs of the direction indicator lamps of self-propelled vehicles. In such case, the said device equally supplies current to a warning light situated on the instrument panel of the vehicle, as a rule.

Such flashing devices, which are known per se, comprise a time-lagging element as a rule, which is arranged to perform direct or indirect opening and closing of the electrical circuits supplying the different light bulbs in periodical or intermittent manner, the said bulbs being those of the sidelamps employed to indicate an intended change in direction in the case of a flashing device for self-propelled vehicles, and that of the warning light on the instrument panel.

In order to simplify the description, the flashing device according to the invention will hereinafter be referred to as a flasher for self-propelled vehicles, although it is evident that it may be applied in other spheres, and this without necessarily performing the function of providing an intermittent supply of current to incandescent bulbs.

The flasher unit according to the invention is of the type in which the time-lagging element incorporated therein comprises a pivotally mounted blade made of a ferromagnetic substance and operating with a principal electromagnet and a pneumatic delaying system.

The delaying system preferably but not mandatorily comprises a deformable enclosure into which air can enter slowly, and form which it may escape more quickly, this pneumatic enclosure being intercalated between the said blade and the said electromagnet.

According to a first feature of the flasher unit according to the invention, it comprises a principal electrical circuit extending from a positive terminal to earth through the sidelamp bulbs placed in circuit by means of an appropriate switch, the coil of the principal electromagnet for operation of the said blade being arranged in series in this principal circuit, the periodical displacement of the said blade causing de-energisation of the said coil and, by lowering the overall resistance of the principal circuit, causes thesaid sidelamps to light up.

According to another feature of the invention, the principal circuit comprises the coil of a secondary electromagnet which by attraction of an electrical contact causes the closing of a derivation or shunt circuit arranged to supply current to a warning lamp, this closing attraction being effective only when the coil of the electromagnet for operation of the said blade is de-energised, with correlative increase of the current intensity traversing the principal circuit and in particular the coil of the secondary electromagnet.

According to another feature of the invention, the said blade controls the displacement of two electrical contacts, of which one controls the principal circuit and the other controls the energisation or de-energisation of the coil of the principal electromagnet.

According to another feature of the flashing device according to the invention, the pneumatic delaying element comprises a hollow core of soft iron encircled by a winding, a pneumatic enclosure comprising a bellows positioned around the said core and solidary with an oscillatory blade loaded by means of a spring, the said blade bearing a valve controlling the inflow and outflow of air into and out of the said enclosure occurring through the central bore of the said core.

According to another feature of the invention, the inflow of air is controlled by means of a hollow screw engaged in a tapped portion of the central bore of the said core, this screw being applied to squash a resilient washer or the like in greater or lesser degree in such manner as to vary the cross-sectional area available in the said washer for traversal by the air.

The invention will now be described, with reference to the accompanying drawing which shows an embodiment of the invention, but in no restrictive sense.

The sole accompanying figure diagrammatically illustrates the flashing device according to the invention and supplying current to the sidelamps and warning lamp of a direction indicator system for a self-propelled vehicle.

Within a box or case $b$, the flasher unit comprises a delaying element 1 controlling the displacement of a ferromagnetic blade 2 about a knife-edge or pivot 3, two electrical contacts 4 and 5 actuated by the displacement of the said blade, and a spring 6 for loading the said blade.

The delaying element 1 comprises a core $1a$ made of soft iron, perforated by a central passage $1b$. This passage is obstructed in greater or lesser degree by means of a washer or the like 7, which is squashed in greater or lesser degree by means of a hollow screw screwed into the passage $1b$.

A coil $1c$ is situated around the said core. Over the core $1a$ is mounted a bellows $1d$ whereof the end facing away from the said core is secured in sealed manner to the surface of the blade 2. The blade 2 has an opening $2c$ controlled by means of a valve 9. When an appropriate current traverses the coil $1c$, the blade 2 is attracted by the core $1a$, deforming the bellows $1d$ from which air is expelled through the washer 7 and the hollow screw 8, and principally through the valve 9. When the current is interrupted in the coil $1c$, the spring 6 tends to return the said blade to its initial position and air penetrates into the bellows $1d$, but solely through the washer 7 and the hollow screw 8, that is to say much more slowly. The duration of the return stroke of the said blade 2 may evidently be adjusted by applying a greater or lesser squashing action on the washer 7 by means of the screw 8.

During its displacement, and by means of its two limbs $2a$ and $2b$, the blade 2 actuates two contact-bearers $4a$ and $5a$. The contact-bearer $5a$ is arranged on a tipping or rocking yoke or the like $5b$.

Starting from a positive input terminal E, the principal electrical circuit comprises a coil 10 with the function of attracting a contact-bearer $11a$ forming part of a contact 11. For the position of the contact-bearers $4a$ and $5a$ illustrated in solid lines, the principal circuit then continues from the point A to the point B, through the coil $1c$, through the contact 5 to the point C, and terminates at $S_1$. When the contact-bearers $4a$ and $5a$ are in the position illustrated by broken lines, the coil $1c$ is deenergised, the principal circuit passing direct from A to B through the contact 5, then from B to C through the closed contact 4.

The outlet $S_1$ may be connected by means of a switch 20 to the near-side sidelamps $Ug$ situated at the left-hand side of the self-propelled vehicle, or to the off-side sidelamps $Ud$ at the right-hand side, each of which is earthed. Finally, starting from a point D, a secondary circuit comprising a contact 11, actuates the warning lamp T connected to the outlet $S_2$, the said warning lamp being earthed.

The operation of the flasher unit according to the invention will now be described in detail: The coil 1c is included in the principal circuit when the said blade and the said contact-bearers are in the initial position illustrated by solid lines. The principal cricuit being closed and earthed through the sidelamps Ug or the sidelamps Ud by means of the switch 20, and current being supplied to the circuit from E, the intensity of the current traversing the circuit is inadequate to light up the sidelamps and inadequate to cause attraction of the contact-bearer 11a by the coil 10 for supply of current to the secondary circuit feeding the warning lamp T. The said sidelamps and the said warning lamps are not alight, therefore.

During this period, the coil 1c attracts the blade 2, causing the latter to pivot about the knife-edge or pivot 3. During attraction of the blade 2, the air issues very quickly from the bellows 1d, this outflow occurring essentially through the valve 9. This very rapid attraction causes a change in the position of the two contact-bearers 4a and 5a whereof the new position is illustrated by broken lines, accompanied by tipping or rocking of the yoke or the like 5b which causes the contact 5 to switch over, and the contact 4 to close.

The coil 1c is short-circuited for this position of the contact-bearers. The principal circuit extends direct from A to B through the contact 5, then from B to C through the closed contact 4.

The current flowing therein is then sufficient to light up the said sidelamps placed in series by means of the switch 20. Analogously, the current is sufficient for the coil 10 to attract the contact-bearer 11a to close the contact 11, which closes the secondary circuit and supplies current to the warning lamp T. The said sidelamps and the warning lamp thus light up briefly.

The coil 1c is short-circuited for this position of the the said blade returns to its initial position by the action of the loading spring 6, air penetrating slowly into the bellows 1d through the deformable washer 7 and the hollow screw 8. This inflow of air and the return of the said blade are very gradual, but the contact-bearer 4a is displaced almost immediately, causing the opening of the contact 4 and of the principal circuit. The principal circuit is open throughout the return stroke of the blade 2. The said sidelamps and the said warning light are thus extinguished.

At or near the end of the return stroke of the blade 2, the yoke or the like 5b tips, causing switch-over of the contact 5. The aggregate then returns to the initial condition and the flashing cycle begins again.

The cyclic operation continues until the switch 20 is returned to its neutral postion. It is apt to point out that the period of the cycle of operation is adjustable by means of the screw 8, which by applying greater or lesser deformation by compression to the deformable washer 7 will modify the duration of the return stroke of the blade 2 by varying the cross-sectional area available for entry of air into the bellows 1d.

The present invention is evidently not limited to the form of embodiment described and illustrated, but encompasses any modifications lying within its scope. In particular, the system for periodical actuation of an electrical circuit which has been described may be employed in other applications than the operation of flashing direction indicator lamps of self-propelled vehicles.

I claim:

1. A flashing device for supplying electric current intermittently from a battery to the direction indicator lamps of a motor vehicle, which device includes a delay element having an arm composed of ferromagnetic material and mounted upon a pivot, the arm being controlled for pivotal movement by an electromagnet and a pneumatic delaying device; means connecting in a series circuit, between the terminals of the said battery, the indicator lamps and the said electromagnet whereby when said electromagnet is energized said arm is pivoted; and contact means associated with said arm for causing de-energization of said electromagnet and for causing a lowering of the overall resistance of said series circuit, when said arm is pivoted.

2. A device according to claim 1, wherein said pneumatic delaying device includes a deformable enclosure positioned between said arm and said electromagnet and arranged so that air may escape from the said enclosure more quickly than air may enter it.

3. A device according to claim 1, wherein said series circuit includes a further electromagnet having contacts in a secondary circuit for operating a warning lamp, said secondary circuit being operative only when said first electromagnet is de-energized.

4. A device according to claim 1, wherein said contact means includes first contacts for controlling said series circuit and second contacts for controlling energization of said electromagnet.

5. A device according to claim 2, wherein said deformable enclosure is defined by bellows joined to said arm and said electromagnet, said arm having a valve for permitting air to flow out of said bellows and said electromagnet having an axial bore for permitting air to flow into and out of said bellows.

6. A device according to claim 5, wherein said bore is provided with an adjustable aperture defined by a resilient washer, and means are provided for adjusting axial compression upon the washer thereby varying its cross-sectional area.

References Cited

UNITED STATES PATENTS

| | | | |
|---|---|---|---|
| 2,339,687 | 1/1944 | Doane | 315—83 X |
| 2,648,059 | 8/1953 | Hostetler | 315—83 X |

JOHN W. HUCKERT, *Primary Examiner.*

J. R. SHEWMAKER, *Assistant Examiner.*